United States Patent
Salkintzis (10) Patent No.: US 10,841,857 B2
(45) Date of Patent: Nov. 17, 2020

(54) DATA PACKET ROUTING IN A REMOTE UNIT

(71) Applicant: Motorola Mobility LLC, Chicago, IL (US)

(72) Inventor: Apostolis Salkintzis, Athens (GR)

(73) Assignee: Motorola Mobility LLC, Chicago, IL (US)

( * ) Notice: Subject to any disclaimer, the term of this patent is extended or adjusted under 35 U.S.C. 154(b) by 0 days.

(21) Appl. No.: 15/751,139

(22) PCT Filed: Feb. 7, 2017

(86) PCT No.: PCT/EP2017/052593
§ 371 (c)(1),
(2) Date: Feb. 7, 2018

(87) PCT Pub. No.: WO2018/145723
PCT Pub. Date: Aug. 16, 2018

(65) Prior Publication Data
US 2020/0092790 A1  Mar. 19, 2020

(51) Int. Cl.
*H04W 40/24* (2009.01)
*H04L 12/725* (2013.01)
*H04W 76/10* (2018.01)

(52) U.S. Cl.
CPC ........... *H04W 40/246* (2013.01); *H04L 45/30* (2013.01); *H04W 76/10* (2018.02)

(58) Field of Classification Search
CPC ...... H04L 45/30; H04W 76/10; H04W 40/246
See application file for complete search history.

(56) References Cited

U.S. PATENT DOCUMENTS

2014/0269547 A1* 9/2014 Valliappan ............ H04W 16/02
                                                                          370/329
2017/0274900 A1* 9/2017 Lee ........................ B60W 10/06
(Continued)

OTHER PUBLICATIONS

LTE, "3rd Generation Partnership Project; Technical Specification Group Services and System Aspects; System Architecture for the 5G System; Stage 2 (Release 15)", 3GPP TS 23.501 V. 2.0, Feb. 6, 2017, pp. 1-69.
(Continued)

*Primary Examiner* — Brian D Nguyen
(74) *Attorney, Agent, or Firm* — Kunzler Bean & Adamson (57) ABSTRACT

Apparatuses, methods, and systems are disclosed for data packet routing in a remote unit. An apparatus includes a processor that receives a data packet to be transmitted and determines packet routing information for the data packet, the packet routing information comprising at least one of: network slice information, a continuity type, and a data network name for the data packet. The processor also determines whether the packet routing information matches a network connection and sends the data packet over a matching network connection, in response to determining that the packet routing information matches a network connection. In some embodiments, the apparatus includes a transceiver that communicates with a mobile communication network using at least one network connection of a first connection type associated with network slice information, a continuity type, and a DNN.

19 Claims, 7 Drawing Sheets

(56) References Cited

U.S. PATENT DOCUMENTS

2019/0174498 A1* 6/2019 Samdanis ............. H04W 16/10
2019/0208465 A1* 7/2019 Mihaly ................... H04W 8/26

OTHER PUBLICATIONS

PCT/EP2017/052593, "Notification of Transmittal of the International Search Report and the Written Opinion of the International Searching Authority, or the Declaration", dated Oct. 9, 2017, pp. 1-14.

* cited by examiner

UE Routing Policy (URP)
300

URP Rules
305

| URP rule 1 | Priority 1 |
|---|---|
| URP rule 2 | Priority 2 |
| URP rule 3 | Priority 3 |
| URP rule 4 | Priority 4 |
| ⋮ | ⋮ |
| URP rule N | Priority N |

FIG. 3A

URP Rule
305

| Traffic Filter | 310 | Value |
|---|---|---|
| Direct Offload | 315 | Value |
| Slice Information | 320 | Value |
| Continuity Type | 325 | Value |
| Data Network Name | 330 | Value |
| Access Type | 335 | Value |

FIG. 6

DATA PACKET ROUTING IN A REMOTE UNIT

CROSS-REFERENCE TO RELATED APPLICATIONS

This patent application claims priority to International PCT Application No. PCT/EP2017/052593 filed on Feb. 7, 2017 for Apostolis Salkintzis titled "Data Packet Routing in a Remote Unit," the entire contents of which are incorporated herein by reference for all purposes. See MPEP § 213.

FIELD

The subject matter disclosed herein relates generally to wireless communications and more particularly relates to data packet routing in a remote unit, such as a 5G user equipment.

BACKGROUND

The following abbreviations are herewith defined, at least some of which are referred to within the following description.
   3GPP Third Generation Partnership Project
   4G Fourth Generation
   5G Fifth Generation
   AP Access Point
   DSCP Differentiated Services Code Point
   DL Downlink
   DNN Data Network Name
   eNB Evolved Node B
   EPC Evolved Packet Core
   ePDG Enhanced Packet Data Gateway
   E-UTRAN Evolved Universal Terrestrial Radio Access
   IMS IP Multimedia Subsystem
   IoT Internet of Things
   IP Internet Protocol
   LAN Local Area Network
   LTE Long Term Evolution
   NSSAI Network Slice Selection Assistance Information
   OFDM Orthogonal Frequency Division Multiplexing
   PASP PDU Access Selection Policy
   PDU Packet Data Unit
   PLMN Public Land Mobile Network
   RAN Radio Access Network
   SC-FDMA Single Carrier Frequency Division Multiple Access
   SIP Session Initiation Protocol
   S-NSSAI Session Network Slice Selection Assistance Information
   SSC Session and Service Continuity
   SSID Service Set Identification
   TCP Transmission Control Protocol
   UDP User Datagram Protocol
   UE User Entity/Equipment (Mobile Terminal)
   UL Uplink
   URP User Equipment Routing Policy
   WiMAX Worldwide Interoperability for Microwave Access
   WLAN Wireless Local Area Network Currently, a remote unit, such as fifth generation ("5G") UE may have multiple network interfaces, each one using either a 3GPP access (e.g. 5G radio access) or a non-3GPP access (e.g. WLAN radio access, satellite radio access, etc.). A UE transfers data traffic via a network connection between the UE and the mobile communication network, such as a PDU session, which is established either over 3GPP access or non-3GPP access. In some embodiments, the UE may offload data traffic directly over a non-3GPP access network.

A PDU session is essentially a virtual data connection between the UE and the mobile communication network that is explicitly established by the UE. The PDU session has certain attributes negotiated by the UE and the mobile communication network when the PDU session is established. These attributes remain the same throughout the lifetime of the PDU session. A PDU session may be established via 3GPP access or via non-3GPP access.

BRIEF SUMMARY

Methods, apparatuses, and system for data packet routing in a remote unit are disclosed. The apparatuses and systems perform the functions of the methods.

In one embodiment, a method for data packet routing in a remote unit includes receiving a data packet to be transmitted and determining packet routing information for the data packet. Here, the packet routing information includes network slice information, a continuity type, and a data network name ("DNN"). The method also includes determining whether the packet routing information matches a network connection of a first connection type, wherein the remote unit has at least one network connection to a mobile communication network of the first connection type. Each network connection of the first connection type is associated with network slice information, a continuity type, and a DNN. The method further includes sending, by the remote unit, the data packet over a matching network connection, in response to determining that the packet routing information matches a network connection.

BRIEF DESCRIPTION OF THE DRAWINGS

A more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which.

DETAILED DESCRIPTION

As will be appreciated by one skilled in the art, aspects of the embodiments may be embodied as a system, apparatus, method, or program product. Accordingly, embodiments may take the form of an entirely hardware embodiment, an entirely software embodiment (including firmware, resident software, micro-code, etc.) or an embodiment combining software and hardware aspects.

For example, the disclosed embodiments may be implemented as a hardware circuit comprising custom very-large-scale integration ("VLSI") circuits or gate arrays, off-the-shelf semiconductors such as logic chips, transistors, or other discrete components. The disclosed embodiments may also be implemented in programmable hardware devices such as field programmable gate arrays, programmable array logic, programmable logic devices, or the like. As another example, the disclosed embodiments may include one or more physical or logical blocks of executable code which may, for instance, be organized as an object, procedure, or function.

Furthermore, embodiments may take the form of a program product embodied in one or more computer readable storage devices storing machine readable code, computer readable code, and/or program code, referred hereafter as code. The storage devices may be tangible, non-transitory, and/or non-transmission. The storage devices may not embody signals. In a certain embodiment, the storage devices only employ signals for accessing code.

Any combination of one or more computer readable medium may be utilized. The computer readable medium may be a computer readable storage medium. The computer readable storage medium may be a storage device storing the code. The storage device may be, for example, but not limited to, an electronic, magnetic, optical, electromagnetic, infrared, holographic, micromechanical, or semiconductor system, apparatus, or device, or any suitable combination of the foregoing.

More specific examples (a non-exhaustive list) of the storage device would include the following: an electrical connection having one or more wires, a portable computer diskette, a hard disk, a random-access memory ("RAM"), a read-only memory ("ROM"), an erasable programmable read-only memory ("EPROM" or Flash memory), a portable compact disc read-only memory ("CD-ROM"), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to," unless expressly specified otherwise. An enumerated listing of items does not imply that any or all of the items are mutually exclusive, unless expressly specified otherwise. The terms "a," "an," and "the" also refer to "one or more" unless expressly specified otherwise.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Aspects of the embodiments are described below with reference to schematic flowchart diagrams and/or schematic block diagrams of methods, apparatuses, systems, and program products according to embodiments. It will be understood that each block of the schematic flowchart diagrams and/or schematic block diagrams, and combinations of blocks in the schematic flowchart diagrams and/or schematic block diagrams, can be implemented by code. This code may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the schematic flowchart diagrams and/or schematic block diagrams.

The code may also be stored in a storage device that can direct a computer, other programmable data processing apparatus, or other devices to function in a particular manner, such that the instructions stored in the storage device produce an article of manufacture including instructions which implement the function/act specified in the schematic flowchart diagrams and/or schematic block diagrams.

The code may also be loaded onto a computer, other programmable data processing apparatus, or other devices to cause a series of operational steps to be performed on the computer, other programmable apparatus or other devices to produce a computer implemented process such that the code which execute on the computer or other programmable apparatus provide processes for implementing the functions/acts specified in the schematic flowchart diagrams and/or schematic block diagram.

The schematic flowchart diagrams and/or schematic block diagrams in the Figures illustrate the architecture, functionality, and operation of possible implementations of apparatuses, systems, methods, and program products according to various embodiments. In this regard, each block in the schematic flowchart diagrams and/or schematic block diagrams may represent a module, segment, or portion of code, which includes one or more executable instructions of the code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

The description of elements in each figure may refer to elements of proceeding figures. Like numbers refer to like elements in all figures, including alternate embodiments of like elements.

In order to solve the problem of efficiently routing traffic (e.g., data packets) in a 5G UE, a UE routing policy is disclosed for selecting a particular PDU session or establishes a new PDU session based on whether PDU session characteristics match rules in the UE routing policy. The UE routing policy includes a plurality of prioritized UE routing policy rules and UE selects the highest priority UE routing policy rule that matches a data packet (e.g., received from higher layers within the UE). Each UE routing policy rule includes a traffic filter field (used to match a data packet to a rule) and routing information including one or more of: a slice information field, a continuity type field, and a data network field, the routing information defining PDU session characteristics that the UE matches to existing PDU connections. If no PDU session matches the routing information in the UE routing policy rule, then the UE requests a new PDU session that supports the routing information parameters in the UE routing policy rule.

The UE routing policy may also indicate whether direct offloading of matching traffic is preferred, permitted, or prohibited. Each UE routing policy rule may also include a direct offload field that indicates if the direct offloading of matching traffic is preferred, permitted, or prohibited for a data packet matching the rule. When preferred, the UE attempts to directly offload matching traffic before searching for matching PDU sessions. When direct offloading is permitted, the UE attempts to directly offload matching traffic only if unsuccessful in establishing a PDU session that supports the parameters in the UE routing policy rule. When direct offloading is prohibited, the UE is not allowed to directly offload matching traffic.

Figure 1:
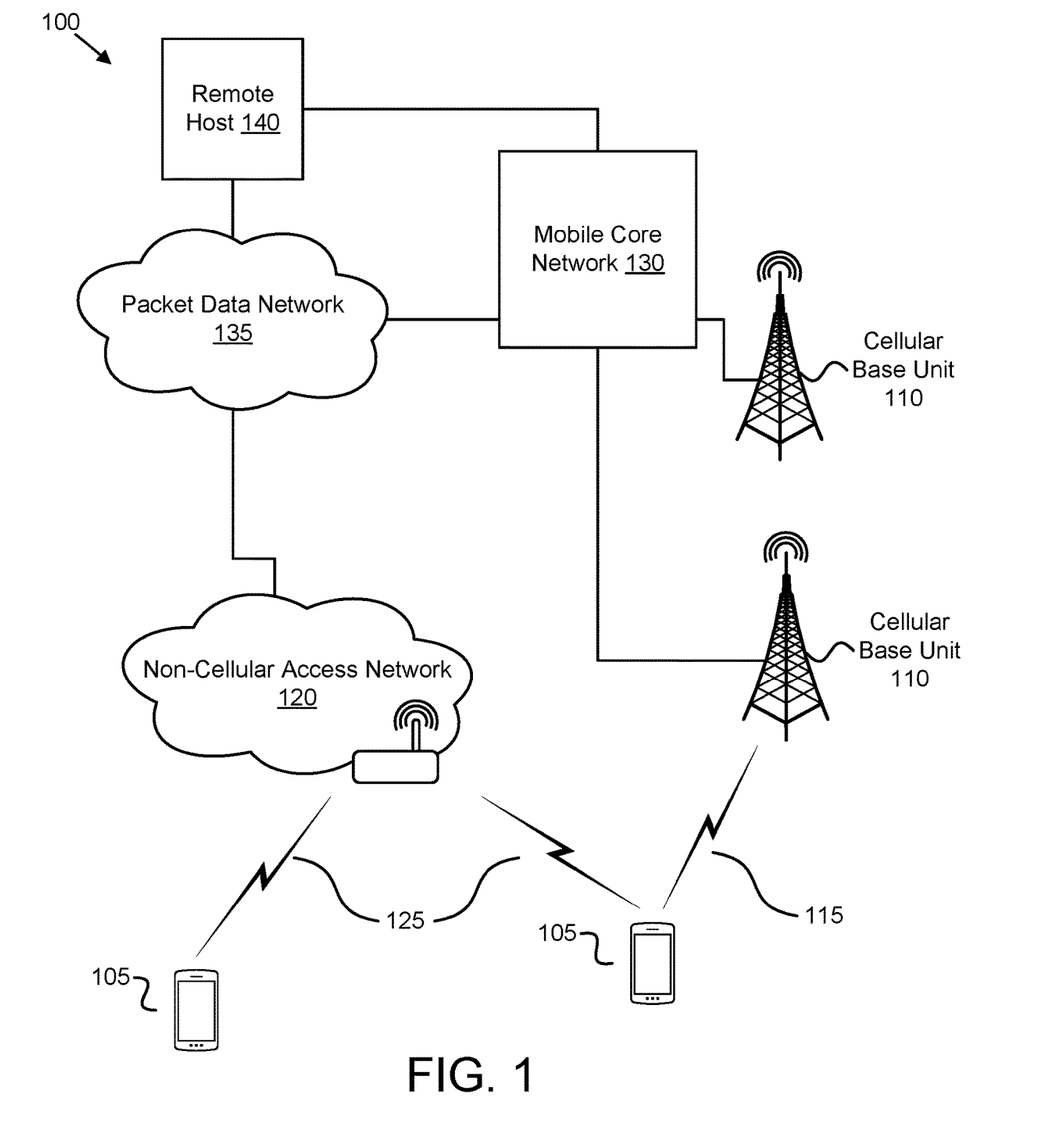
FIG. 1 is a schematic block diagram illustrating one embodiment of a wireless communication system for data packet routing in a remote unit.

FIG. 1 a wireless communication system 100 for data packet routing in a remote unit, according to embodiments of the disclosure. In one embodiment, the wireless communication system 100 includes remote units 105, cellular base units 110, cellular communication links 115, non-cellular access networks 120, and non-cellular communication links 125. Even though a specific number of remote units 105, cellular base units 110, cellular communication links 115, non-cellular access networks 120, and non-cellular communication links 125 are depicted in FIG. 1, one of skill in the art will recognize that any number of remote units 105, cellular base units 110, cellular communication links 115, non-cellular access networks 120, and non-cellular communication links 125 may be included in the wireless communication system 100.

In one implementation, the wireless communication system 100 is compliant with the long-term evolution ("LTE") of the 3GPP protocol, wherein the cellular base units 110 transmit using an orthogonal frequency division multiplexing ("OFDM") modulation scheme on the DL and the remote units 105 transmit on the UL using a single-carrier frequency division multiple access ("SC-FDMA") scheme. More generally, however, the wireless communication system 100 may implement some other open or proprietary communication protocol, for example, WiMAX, among other protocols. The present disclosure is not intended to be limited to the implementation of any particular wireless communication system architecture or protocol.

In one embodiment, the remote units 105 may include computing devices, such as desktop computers, laptop computers, personal digital assistants ("PDAs"), tablet computers, smart phones, smart televisions (e.g., televisions connected to the Internet), smart appliances (e.g., appliances connected to the Internet), set-top boxes, game consoles, security systems (including security cameras), vehicle on-board computers, network devices (e.g., routers, switches, modems), or the like. In some embodiments, the remote units 105 include wearable devices, such as smart watches, fitness bands, optical head-mounted displays, or the like.

Moreover, the remote units 105 may be referred to as subscriber units, mobiles, mobile stations, users, terminals, mobile terminals, fixed terminals, subscriber stations, UE, user terminals, a device, or by other terminology used in the art. The remote units 105 may communicate directly with one or more of the cellular base units 110 via uplink ("UL") and downlink ("DL") communication signals. Furthermore, the UL and DL communication signals may be carried over the cellular communication links 115. Similarly, the remote units 105 may communicate with one or more non-cellular access networks 120 via UL and DL communication signals carried over the non-cellular communication links 125.

In some embodiments, the remote units 105 communicate with a remote host 140 via a network connection with the mobile core network 130. For example, a remote unit 105 may establish a PDU connection with the mobile core network 130 using either a cellular base unit 110 or a non-cellular access network 120. The mobile core network 130 then relays traffic between the remote unit 105 and the remote host 140 using the PDU connection. In other embodiments, the remote unit 105 may communicate with the remote host over the non-cellular access network 120 without traffic passing through the mobile core network 130. This is referred to as direct offloading.

The cellular base units 110 may be distributed over a geographic region. In certain embodiments, a cellular base unit 110 may also be referred to as an access terminal, a base, a base station, a Node-B, an eNB, a Home Node-B, a relay node, a device, or by any other terminology used in the art. The cellular base units 110 are generally part of a radio access network ("RAN") that may include one or more controllers communicably coupled to one or more corresponding cellular base units 110. These and other elements of radio access network are not illustrated but are well known generally by those having ordinary skill in the art. The cellular base units 110 connect to the mobile core network 130 via the RAN.

The cellular base units 110 may serve a number of remote units 105 within a serving area, for example, a cell or a cell sector via a wireless communication link. The cellular base units 110 may communicate directly with one or more of the remote units 105 via communication signals. Generally, the cellular base units 110 transmit downlink ("DL") communication signals to serve the remote units 105 in the time, frequency, and/or spatial domain. Furthermore, the DL communication signals may be carried over the cellular communication links 115. The cellular communication links 115 may be any suitable carrier in licensed or unlicensed radio spectrum. The cellular communication links 115 facilitate communication between one or more of the remote units 105 and/or one or more of the cellular base units 110.

The non-cellular access networks 120 may be distributed over a geographic region. Each non-cellular access network 120 may serve a number of remote units 105 with a serving area. Typically, a serving area of the non-cellular access networks 120 are smaller than the serving area of a cellular base units 110. The non-cellular access networks 120 may communicate directly with one or more remote units 105 by receiving UL communication signals and transmitting DL communication signals to serve the remote units 105 in the time, frequency, and/or spatial domain. Both DL and UL communication signals are carried over the non-cellular communication links 125. A non-cellular access network 120 may communicate using unlicensed radio spectrum.

As depicted in FIG. 1, a non-cellular access network 120 connects to a mobile core network 130 via a packet data network 135. In certain embodiments, a non-cellular access network 120 may be controlled by an operator of the mobile core network 130 and may have direct access to the mobile core network 130. In other embodiments, a WLAN AN 110 is not controlled by the operator of the mobile core network 130 and thus does not have direct access to the mobile core network 130. Here, the non-cellular access networks 120 rely on a packet data network 135, such as the Internet, to connect to the mobile core network 130. The mobile core network 130 may provide services to a remote unit 105 via the non-cellular access networks 120, as described in greater detail herein.

In one embodiment, the mobile core network 130 is a 5G packet core or the evolved packet core ("EPC") specified in LTE specifications, which may be coupled to other networks, like the Internet and private data networks, among other packet data networks 135. Each mobile core network 130 belongs to a single public land mobile network ("PLMN"). The present disclosure is not intended to be limited to the implementation of any particular wireless communication system architecture or protocol. Thus, in a non-LTE implementation, the cellular base units 110 may be coupled to a non-EPC type of packet core network, such as to a "5G" packet core network.

As depicted, a remote unit 105 may be connected to both a cellular base unit 110 and a non-cellular access network 120. The remote unit 105 may establish several network connections of a first connection type, such as PDU sessions, via the cellular base unit 110 and the non-cellular access network 120. The remote unit 105 may also be able to directly offload certain traffic via the non-cellular access network 120 using a network connection of a second type (e.g., a direct offload connection). When directly offloading traffic, the remote unit 105 communicates with the remote host 140 via the non-cellular access network 120 without the traffic passing through the mobile core network 130.

The mobile core network 130 provisions the remote unit 105 with a routing policy, e.g., a UE routing policy ("URP") and the remote unit 105 determines whether to directly offload traffic or send the traffic over a certain PDU session based on the URP. As described in further detail, below, each rule in the URP includes at least one of: slice information, continuity type, and data network parameters used to identify a matching PDU session (or request a new PDU session supporting the parameters in the rule). For example, a first URP rule may include slice information and continuity type, while a second URP rule includes only continuity type. In certain embodiments, an URP rule indicates whether direct offload is preferred, permitted, or prohibited for traffic matching the rule. The URP and URP rules are described in further detail below, with reference to FIGS. 3A-3B.

Figure 2:
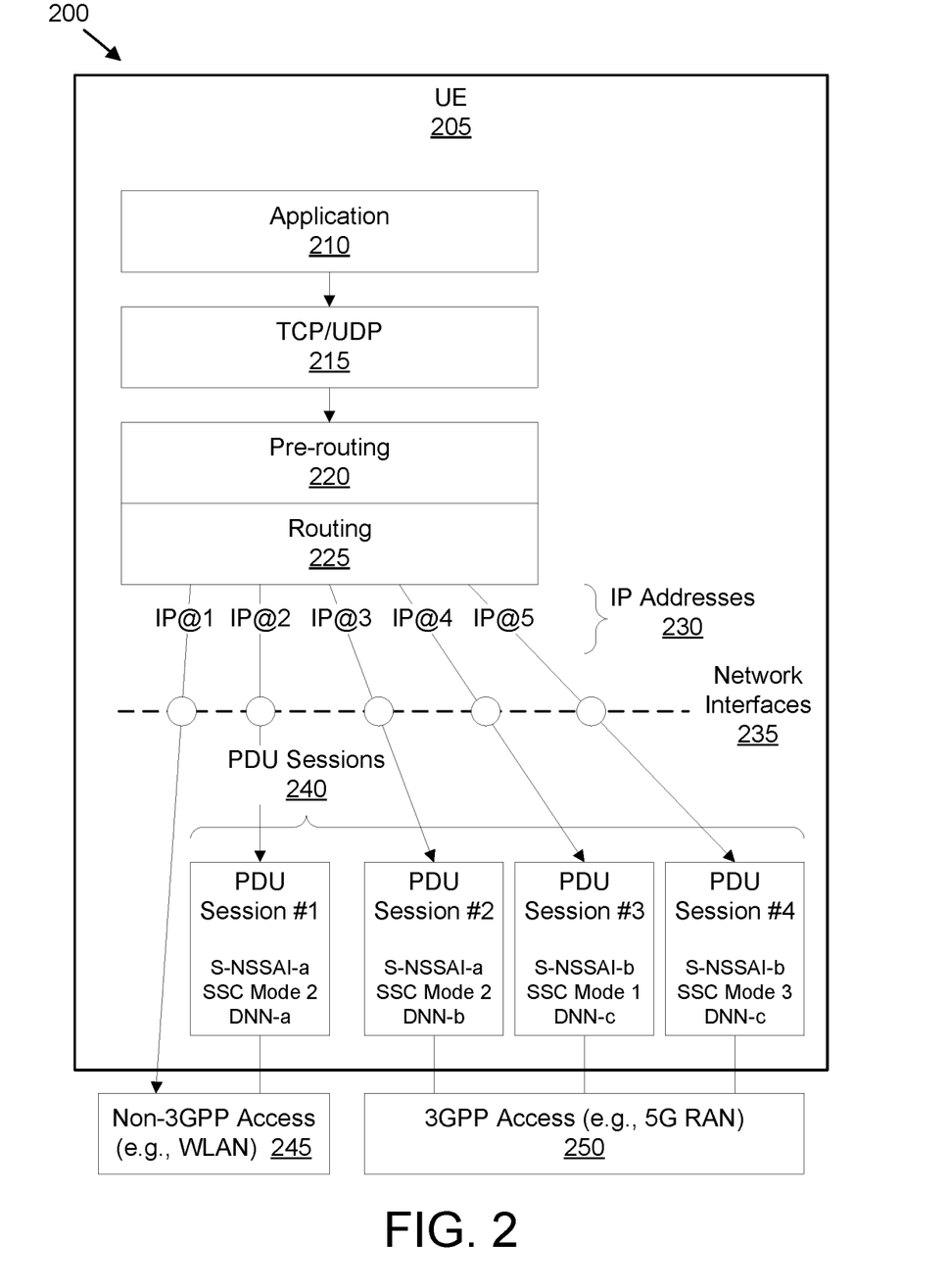
FIG. 2 illustrates one embodiment of a protocol architecture for data packet routing in a remote unit.

FIG. 2 depicts a protocol architecture 200 used for data packet routing in a remote unit, according to embodiments of the disclosure. The protocol architecture 200 is implemented within a UE 205. The UE 205 may be one embodiment of the remote unit 105 discussed above with reference to FIG. 1. The UE 205 includes at least one application operating at an application layer 210 within the UE 205. The application may generate a packet to be transferred outside the UE 205 (e.g., to the remote host 140). The application layer 210 passes the packet to the TCP/UDP layer 215.

The TCP/UDP layer 215 generally operates at a transport later within the UE 205. Here, the TCP/UDP layer 215 provides session and datagram communication services (e.g., for the application layer 210). The TCP/UDP layer 215 passes the packet to the IP layer, which includes a pre-routing component 220 and a routing component 225. The pre-routing component 220 provides services such as network address translation ("NAT"), destination network address translation ("DNAT"), port mapping, port redirecting, and the like.

The routing component 225 selects a network connection and network interface 235 for transmitting the packet. As shown, the UE 205 has a plurality of network connections associated with a plurality of IP addresses 230. The IP addresses 230 may be internal (e.g., private) addresses, external (e.g., pubic) addresses, or a combination. The plurality of network connections can be categorized into PDU sessions and non-PDU-session network connection (also referred to as a "direct offload connection"). All network connections through the 3GPP access 250 are PDU sessions 240. Additionally, PDU sessions 240 may be established using the non-3GPP access 245. However, not all network connections through the non-3GPP access 245 are PDU sessions 240.

Each PDU session has certain attributes, including a slice information attribute, a continuity type attribute, and a data network name attribute. As noted above, these attributes remain the same throughout the lifetime of the PDU session. A PDU session may have additional attributes (e.g. a "type" which can be IPv4, IPv6, Ethernet, etc.). An access type attribute may indicate whether the PDU session is established over the non-3GPP access 245 or the 3GPP access 250.

The slice information attribute defines the type of service provided by the PDU session and, optionally, a tenant associated with the service (the "service tenant"). The tenant attribute is used to distinguish different network slices providing the same type of service. Examples of slice information attributes include, but are not limited to, [automotive, "Toyota"] or [utility, "BC Hydro"] or [public safety, "Chicago Police Dept."], and [mobile broadband]. In these examples, the first parameter indicates the type of service provided by the PDU session and, where present, the second parameter indicates the service tenant. Note that the second component of the slice information attribute (the tenant) is optional, so it may be omitted as in the last example.

In certain embodiments, the slice information attribute indicates network slicing information, such as a slice type or slice identifier. The network slicing information may be a Session-Network Slice Selection Assistance Information ("S-NSSAI") value, which defines a slice service type and a slice differentiator (e.g., a tenant associated with the service). In FIG. 2, the first PDU session (labeled "PDU session #1") and second PDU session (labeled "PDU session #2") support the same "Slice Info" value (e.g., S-NSSAI-a), while the third PDU session (labeled "PDU session #3") and fourth PDU session (labeled "PDU session #4") both support another "Slice Info" value (e.g., S-NS SAI-b).

The continuity type attribute defines the type of continuity provided by the PDU session. The continuity type value may refer to a session and service continuity ("SSC") mode, such as a SSC Mode 1, SSC Mode 2, and SSC Mode 3. In FIG. 2, the first and second PDU sessions support the same "Continuity Type" (SSC Mode 2), the third PDU session supports SSC Mode 1, and the fourth PDU session supports SSC Mode 3. With SSC Mode 1 (e.g., address preservation continuity), the address assigned to the PDU session is preserved the same for the entire lifetime of the PDU session regardless of UE mobility. SSC Mode 1 ensures that data sessions transferred on the PDU session are not discontinued.

With SSC Mode 2 (e.g., data session continuity), the network address of the PDU session may change, but the old address is also maintained until the data sessions using this address are terminated. For some duration, the PDU session may be assigned with two addresses (e.g., old and new addresses). SSC Mode 2 ensures that data sessions transferred on the PDU session are not discontinued although the address of the PDU session can change. With SSC Mode 3, no session continuity is provided. In this case, data sessions transferred on the PDU session may be discontinued whenever the address assigned to the PDU session changes.

The data network name ("DNN") attribute defines an external data network to which traffic is routed via the PDU session. As an example, the DNN may be "internet" or "IMS" or "mms.operator-x.com." The DDN is similar to the APN (Access Point Name) used in LTE specifications. In FIG. 2, the first PDU session supports traffic to DNN-a, the second PDU session supports traffic to DNN-b and the third and fourth PDU sessions support traffic to DNN-c.

Note that the first PDU session is established over the non-3GPP access 245, while the second, third, and fourth PDU sessions are established over the 3GPP access 250. As depicted, the UE 205 has established a non-PDU-session network connection over the non-3GPP access 245 (associated with the IP address "IP@1"). In certain embodiments, the non-PDU-session network connection may be used for directly offloading traffic.

The UE 205 uses a routing policy (e.g., a UE Routing Policy "URP") to determine how to route outgoing traffic to one of its network interfaces, described in greater detail below, with reference to FIGS. 4-7. Unlike conventional routing policies, the URP considers the attributes of the network connection (PDU sessions) that can be established in a 5G mobile network. The URP is described in greater detail below, with reference to FIGS. 3A-3B.

Figure 3A:
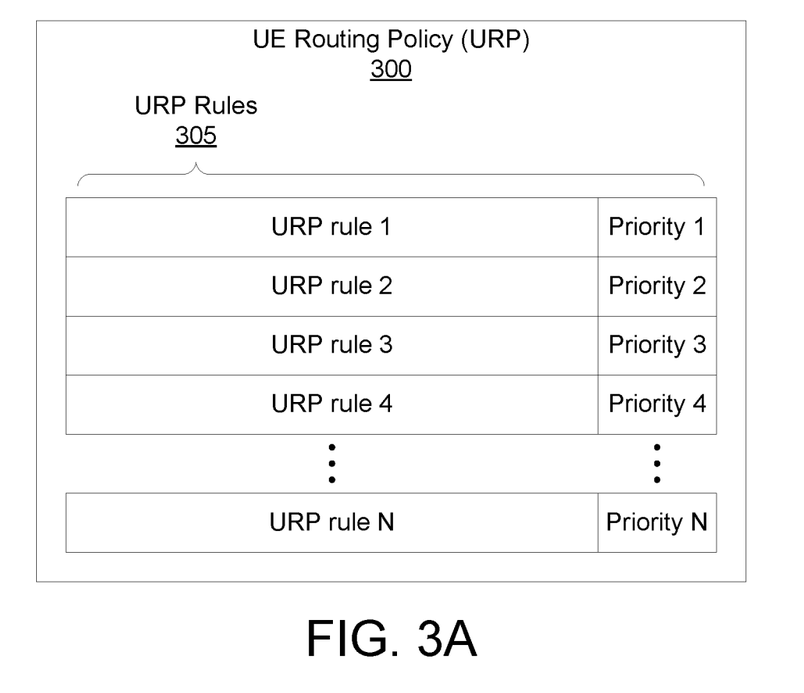
FIG. 3A illustrates one embodiment of a user equipment routing policy ("URP") used for data packet routing in a remote unit.
Figure 3B:
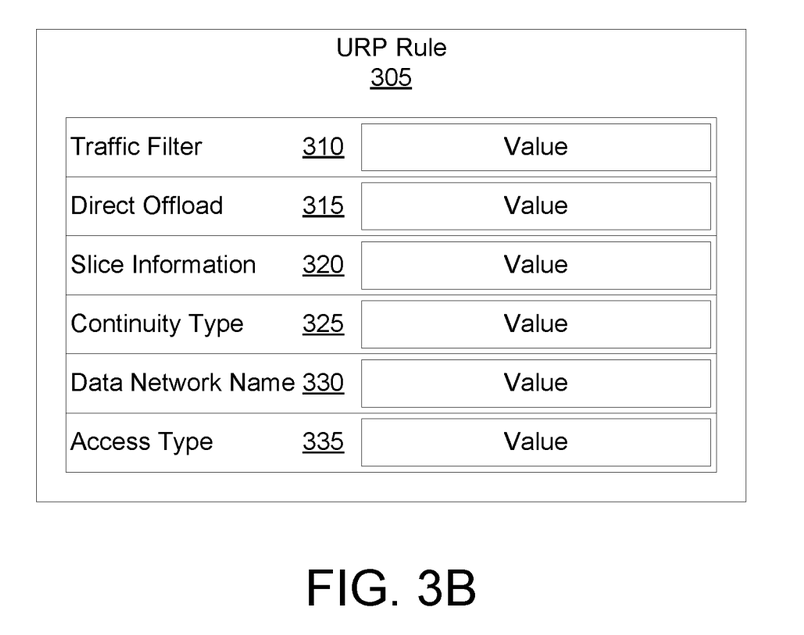
FIG. 3B illustrates one embodiment of a URP rule for data packet routing in a remote unit.

FIGS. 3A-3B depict a UE routing policy ("URP") 300 and a URP rule 305. The URP 300 includes a plurality of prioritized URP rules 305. As shown in FIG. 3A, the URP 300 includes N number of URP rules 305, depicted in descending order of priority. Here, the first listed URP rule 305 has the highest priority, the second listed rules has the next highest priority, and so on until the Nth listed URP rule 305 which has the lowest priority. In certain embodiments, the last URP rule 305 (e.g., the URP rule 305 with the lowest priority) corresponds to a default rule. In this way, every packet can be matched to a rule in the URP 300. The URP 300 is provisioned to the UE 205 (or the remote unit 105) by the mobile communication network (e.g., from an entity in the mobile core network 130).

FIG. 3B illustrates a URP rule 305 having a plurality of components or fields, including at least a traffic filter component 310 and one or more of: a slice information component 320, a continuity type component 325, and a data network component 330. Thus, the URP rule 305 may include one, two, or all three of the slice information component 320, continuity type component 325, and data network component 330. In certain embodiments, the URP rule 305 may also include a direct offload component 315 and/or an access type component 335. Each of the components 310-335 includes a value. In some embodiments, one or more values in the components 310-335 may be a predetermined value indicating that any characteristic will match. For example, the default URP rule 305 may include a value of "any" in the traffic filter component 310, indicating that all traffic matches this rule. Each URP rule 305 indicates how traffic matching the rule is to be routed (e.g., by the UE 205 or remote unit 105).

The traffic filter component 310 includes information to be compared against characteristics of a data packet to determine if the rule is applicable to the data packet. This information may include application identities, protocol names (e.g., TCP, UDP, etc.), source and/or destination port numbers, source and/or destination addresses, DSCP values, and the like. Any data packet whose characteristics match the traffic filter component 310 of a URP rule 305 is referred to as the "matching traffic" for this URP rule 305. As mentioned above, the traffic filter component 310 may include a predetermined value (such as a "null" value) indicating that any traffic characteristics matches this rule, so that the rule applies to all traffic. Such an omnibus URP rule may be used to define default routing behavior of the UE 205.

The direct offload component 315 is an optional field that includes a trinary value which indicates whether the matching traffic is Prohibited, Preferred or Permitted for direct offload to a non-3GPP access network. The direct offload component 315 may also indicate a specific non-3GPP access type (e.g. WLAN) or identifier (e.g., SSID-x), or a list of specific non-3GPP access types or identifiers, for which the matching traffic is Prohibited, Preferred or Permitted. However, if the direct offload component 315 does not indicate a specific non-3GPP access or identifier, then the UE 205 assumes that the value applies to all non-3GPP access.

Where direct offload is Prohibited, then the UE 205 is not allowed to use direct offload to transfer matching traffic for this URP rule 305. Where direct offload is Preferred, then the UE 205 is to first attempt to use direct offload for transferring matching traffic for this URP rule 305 before looking for a matching PDU session. Where direct offload is Permitted, then the UE 205 is to first attempt to find a matching PDU session, but is allowed to use direct offload to transfer matching traffic for this URP rule 305 is a matching PDU session cannot be established.

In some embodiments, the direct offload component 315 may include multiple values, at least one of the multiple values indicating a specific non-3GPP access type or identifier to which the value applies. Where the direct offload component 315 includes a first value that indicates a specific non-3GPP access type or identifier and a second value that does not indicate a specific non-3GPP access type or identifier, then the specific non-3GPP access or identifier then the first value is treated as an exception to the default action indicated by the second value.

For example, if the direct offload component 315 includes a first entry indicating direct offload is Preferred for a WLAN of SSID-a and a second entry indicating direct offload is Permitted for any WLAN (e.g., no specific non-3GPP access type or identified is included with the second entry), then the UE 205 will first attempt to use direct offload for transferring matching traffic over a connected WLAN of SSID-a and attempt to directly offload the matching traffic to any WLAN only if a PDU session matching the URP rule cannot be established. As example, if the direct offload component 315 includes a first entry indicating direct offload is Preferred for a WLAN of SSID-b, a second entry indicating direct offload is Permitted for any WLAN (e.g., no specific non-3GPP access type or identified is included with the second entry), and a third entry indicating direct offload is Prohibited for WLANs of SSID-c and SSID-d, then the UE 205 will first attempt to use direct offload for transferring matching traffic over a connected WLAN of SSID-b and attempt to directly offload the matching traffic to any WLAN that is not SSID-c or SSID-d in the event that a PDU session matching the URP rule cannot be established.

The slice information component 320 includes network slice selection information for the matching traffic for this URP rule 305. The network slice selection information may be a network slice selection parameter, such as a session network slice selection assistance information ("S-NSSAI"). It may also include a prioritized list of network slice selection parameters (e.g., multiple S-NS SAIs in priority order) if the matching traffic may be transferred over a PDU session supporting any of these parameters (e.g., S-NS-SAIs). In certain embodiments, the slice information component 320 also includes tenant information for the matching traffic for this URP rule 305. For example, the S-NSSAI may include a service type parameter and a slice differentiator parameter, where the service type parameter indicates a traffic type (e.g., IoT, automotive, mobile broadband) and the slice differentiator parameter indicates a tenant of the service. Tenant information is used to differentiate network slices for the same service type.

The continuity type component 325 indicates a type of session-level continuity for the matching traffic. As discussed above, the continuity type may be indicated using the SSC mode. In some embodiments, the continuity type component 325 may also include multiple continuity types (e.g., SSC modes) in priority order (e.g., a prioritized list of SSC modes) if the matching traffic may be transferred over a PDU session supporting any of the listed types (e.g., SSC modes). The data network component 330 includes the DNN for the matching traffic. The data network component 330 may also include multiple DNNs in priority order (e.g., a prioritized list of DNNs) if the matching traffic may be transferred over a PDU session associated with any of the listed DNNs.

In certain embodiments, the URP rule 305 may include an access type component 335. The access type component 335 indicates a type of access (e.g., 3GPP or non-3GPP) on which the PDU is to be established. The access type component 335 may also include a prioritized list of accesses on which the PDU session is to be established. Where the UE 205 needs to establish a new PDU session (e.g., due to the UE 205 not having an already established PDU session with the slice information, continuity type, and data network name included in the URP rule 305), the access type component 335 indicates the access type on which establishment of the PDU session is to be attempted (or first attempted where a prioritized list is provided).

As a first example, one URP rule 305 may include a traffic filter component 310 with a value of "Application='Toyota car'", a direct offload component 315 with a value of "Prohibited", a slice information component 320 with a value of "[automotive, 'Toyota']", a continuity type component 325 with a value of "SSC Mode 3", a data network component 330 with a value of "internet", and an access type component 335 of "3GPP access". This rule enforces the following policy: traffic of application "Toyota-car" is not to be directly offloaded to non-3GPP. Rather, the matching traffic is to be transferred on a PDU session with slice information of [automotive (service type), 'Toyota' (tenant)], continuity type of SSC Mode 3,and routed via the internet. The access type component 335 (here, "3GPP") indicates that the UE 205 is to attempt to establish the PDU session over 3GPP access 250 and is not permitted to establish the PDU session over non-3GPP access 245. The direct offload component 315 (here, "Prohibited" without indicating any specific access type or identifier) further indicates that if this PDU session cannot be established (e.g., over the designated access type), then the traffic of this application cannot be transferred.

As a second example, another URP rule 305 may include a traffic filter component 310 with a value of "Protocol=UDP or TCP" and "Port=5060 (i.e., SIP traffic)", a direct offload component 315 with a value of "Permitted", a slice information component 320 with a value of "[mobile broadband]", a continuity type component 325 with a value of "SSC Mode 1", a data network component 330 with a value of "ims", and an access type component 335 of "3GPP, non-3GPP". This rule enforces the following policy: all SIP traffic should be transferred on a PDU session with slice information of "mobile broadband", SSC Mode 1, and routed via the IMS ("IP Multimedia Subsystem"). The access type component 335 (here, "3GPP, non-3GPP") indicates that the UE 205 is to first attempt to establish the PDU session over 3GPP access 250 and to next attempt to establish the PDU session over non-3GPP access 245. The direct offload component 315 (here, "Permitted" without indicating any specific access type or identifier) further indicates that if this PDU session cannot be established (e.g., over the designated access type), then SIP traffic may be directly offloaded to any non-3GPP access.

As a third example, another URP rule 305 may include a traffic filter component 310 with a value of "Application='Location_Tracker'", a direct offload component 315 with a value of "Preferred, Type: WLAN SSID=xyz", a slice information component 320 with a value of "[IoT], [mobile broadband]", a continuity type component 325 with a value of "SSC Mode 3", and a data network component 330 with a value of "operator-x.com". This rule enforces the following policy: all traffic of application "Location_Tracker" should preferably be directly offloaded to WLAN with SSID=xyz. If it cannot be directly offloaded (e.g., if there is no connection to a WLAN with SSID=xyz), the UE 205 is to transfer the matching traffic on a PDU session with slice information of either "IoT" or "mobile broadband", SSC Mode 3, and routed via the data network "operator-x. com."

The direct offload component 315 (here, "Preferred, Type: WLAN SSID=xyz") further indicates that if this PDU session cannot be established and the UE is not connected to a WLAN with SSID=xyz, then traffic of this application cannot be transferred. Note that this URP rule 305 does not an access type component 335, and thus indicating that the PDU session may be established over any access type for the PDU session and without expressing preference on which access type PDU session establishment is attempted. Alternatively, the URP rule 305 may include an access type component 335 with a value of "any," thereby also indicating that the PDU session may be established over any access type for the PDU session and without expressing preference on which access type PDU session establishment is attempted.

As a fourth example, another URP rule 305 may include including a traffic filter component 310 with a value of "Application='Video_Viewer'", a direct offload component 315 with a value of "Preferred (WLAN SSID=xyz), Permitted (WLAN SSID=any)", a slice information component 320 with a value of "[mobile broadband, 'provider-A']", a continuity type component 325 with a value of "SSC Mode 3", a data network component 330 with a value of "streaming.com", and an access type component 335 of "WLAN, 3GPP". This rule enforces the following policy: all traffic of application "Video_Viewer" should preferably be offloaded to WLAN with SSID=xyz. If it cannot be directly offloaded (e.g., if there is no connection to a WLAN with SSID=xyz), then the UE 205 is to transfer the matching traffic on a PDU session with slice information of [mobile broadband, 'provider-A'], SSC Mode 3, and routed via the network "streaming.com." The access type component 335 (here, "WLAN, 3GPP") indicates that the UE 205 is to first attempt to establish the PDU session over WLAN (e.g., non-3GPP access 245) and to next attempt to establish the PDU session over 3GPP access 250. The direct offload component 315 (here, "Preferred (WLAN SSID=xyz), Permitted (WLAN SSID=any)") further indicates that if this PDU session cannot be established (e.g., over the designated access types), then it can be offloaded to any WLAN.

As a fifth example, a default URP rule 305 may include a traffic filter component 310 with a value of "*" (e.g., a special value indicating that all traffic matches), a direct offload component 315 with a value of "Preferred", a slice information component 320 with a value of "[mobile broadband]", a continuity type component 325 with a value of "SSC Mode 2", and a data network component 330 with a value of "internet" note that this URP rule 305 does not include. This rule enforces the following policy: all traffic not matching any other rule should preferably be offloaded directly to any non-3GPP access (note that the direct offload component 315 does not specify a specific non-3GPP access or identifier). If it cannot be directly offloaded to a non-3GPP access, then the UE 205 is to transfer the matching traffic on a PDU session with slice information of [mobile broadband], SSC Mode 2, and routed via the Internet. Note that this URP rule 305 does not an access type component 335, and thus indicating that the PDU session may be established over any access type for the PDU session and without expressing preference on which access type PDU session establishment is attempted. Alternatively, the URP rule 305 may include an access type component 335 with a value of "any," thereby also indicating that the PDU session may be established over any access type for the PDU session and without expressing preference on which access type PDU session establishment is attempted.

Although the URP rules 305 in the above example include each of the slice information component 320, continuity type component 325, and data network component 330, in other embodiments the URP rule 305 may include a slice information component 320 and no continuity type component 325 or data network component 330, a continuity type component 325 and no slice information component 320 or data network component 330, a data network component 330 and no slice information component 320 or continuity type component 325, a slice information component 320 and continuity type component 325 and no data network component 330, a slice information component 320 and data network component 330 and no continuity type component 325, or a continuity type component 325 and data network component 330 and no slice information component 320. In such embodiments, the URP rule 305 includes a traffic filter component 310 and may (or may not) include a direct offload component 315 and/or an access type component.

Figure 4:
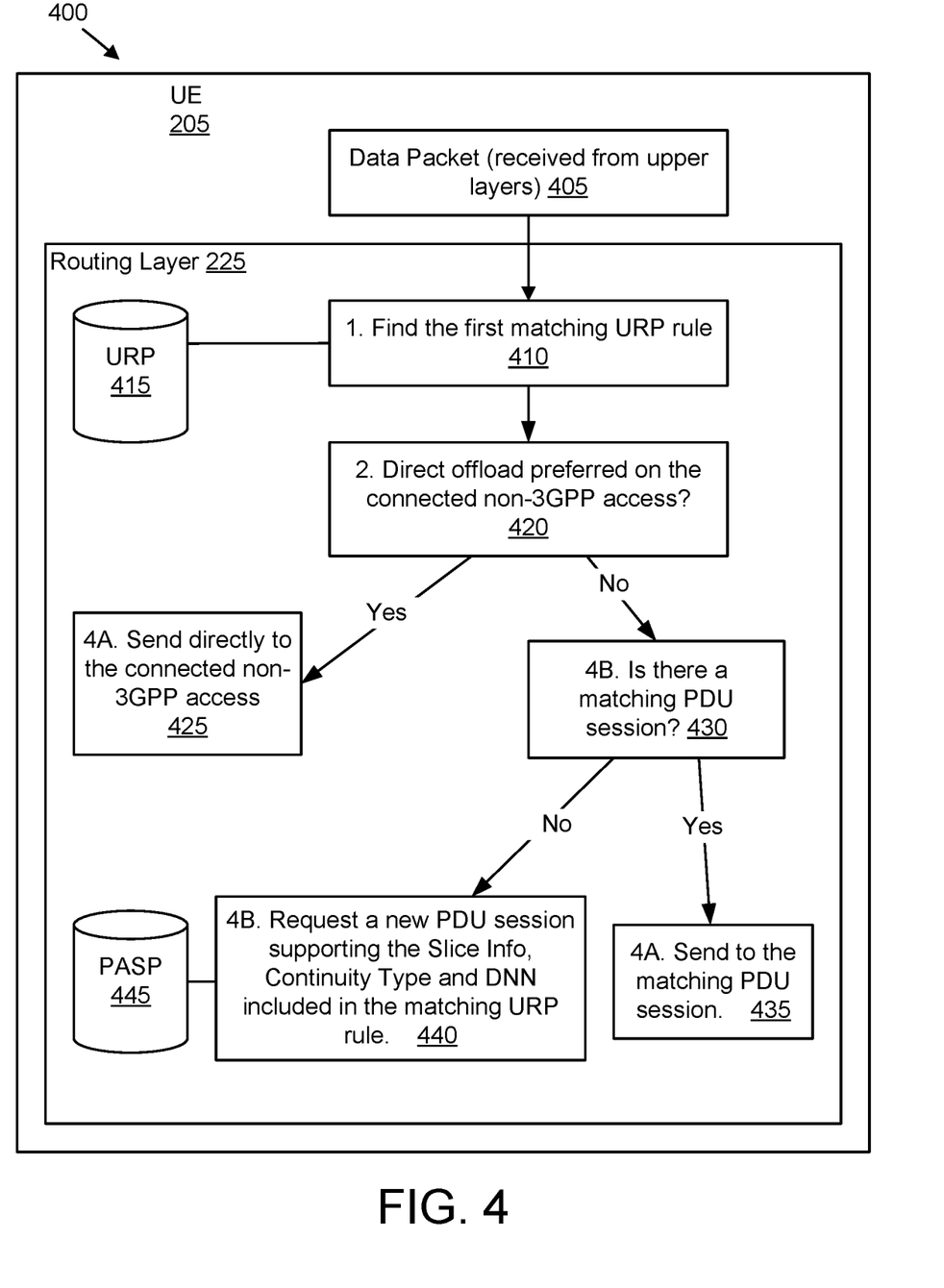
FIG. 4 illustrates one embodiment of a routing component routing traffic (data packets) in a remote unit.

FIG. 4 depicts a procedure 400 used by the routing component 225 for data packet routing in the UE 205, according to embodiments of the disclosure. The procedure 400 begins once the routing component 225 receives a data packet 405 from the upper layers (e.g., the application layer 210, TCP/UDP layer 215, and pre-routing component 220). After receiving the packet, the routing component 225 accesses the URP 415 to find the first matching URP rule (e.g., the highest priority URP rule 305) that matches the received packet (block 410). The URP 415 may be one embodiment of the URP 300 discusses above with reference to FIG. 3A. The URP 415 contains a set of prioritized routing rules and the routing component 225 evaluates the URP rules in priority order. The URP 415 contains a "default" rule, so the UE 205 always finds a URP rule that matches the packet. In one embodiment, the default rule is the lowest priority rule and applies to all traffic. The URP rule that matches the data packet 405 is referred to as the matching URP rule.

Next, the routing component 225 determines whether a direct offload to a connected non-3GPP access 245 is preferred for the data packet 405 (see block 420. As used herein, a direct offload is "preferred" whenever transferring the packet by direct offload (e.g., to a specific non-3GPP access network) has higher priority than transferring the packet using a PDU session. In some embodiments, a preferred direct offload may be indicated in the matching URP rule, as described above with reference to FIG. 3B. In other embodiments, the indication of whether direct offload is preferred may be separate from the URP 415.

If the routing component 225 determines that the data packet 405 should be preferably offloaded to the connected non-3GPP access 245, then the routing component 225 sends the data packet 405 outside of any PDU session using the connected non-3GPP access 245 (i.e., directly offloads the packet, see block 425). In certain embodiments, the UE 205 may attempt to establish a connection with a specific non-3GPP access network or type indicated in the direct offload information if there is not already a connection with the non-3GPP access network or type. Otherwise, if the routing component 225 determines that the data packet 405 should not be preferably offloaded to the connected non-3GPP access 245, then the routing component 225 determines whether the UE 205 has an active PDU session that matches (e.g., supports) the matching URP rule (see block 430).

The UE 205 has an active PDU session that matches a matching URP rule when the active PDU session supports the slice information, continuity type, and DNN included in the matching URP rule. A PDU session that matches the matching URP rule is referred to as the "matching PDU session." If the matching URP rule includes multiple (prioritized) S-NSSAIs, a PDU session that matches this URP rule is the PDU session that supports the highest priority S-NSSAI, as well as the continuity type and DNN. If the matching URP rule includes multiple (prioritized) SSC modes, a PDU session that matches this URP rule is the PDU session that supports the highest priority SSC mode, as well as the S-NSSAI and the DNN.

If the matching URP rule includes multiple (prioritized) S-NSSAIs and multiple (prioritized) SSC modes, a PDU session that matches this URP rule is the PDU session that supports the highest priority S-NSSAI and the highest priority SSC mode and the DNN. In one embodiment, where a URP rule includes multiple (prioritized) S-NS SAIs and multiple (prioritized) SSC Modes, then matching S-NSSAIs take priority over SSC modes. For example, consider a URP rule that lists slice information of "S-NSSAI=A (1st priority), S-NSSAI=B" and continuity type of "SSC Mode 1 (1st priority), SSC Mode 2." Where the UE 205 has a first PDU session with S-NSSAI=B and SSC Mode 3 and a second PDU session with S-NSSAI=A and SSC Mode 2, then the UE 205 will select the second PDU session (having S-NNSAI=A) as matching the slice information has higher priority than matching the continuity type.

If the routing component 225 can find a matching PDU session, the UE 205 transmits the data packet 405 via this PDU session (see block 435). Otherwise, the UE 205 requests the establishment of a new PDU session that supports the attributes in the matching URP rule (see block 440). Here the UE 205 requests a PDU session that supports the slice information, continuity type, and that is associated with the DNN included in the matching URP rule. If the matching URP rule includes an access type component, then the UE 205 attempts to establish this PDU session over the designated access type. If the URP rule does not include an access type component, then UE 205 determines to establish this PDU session over non-3GPP access 245 or over 3GPP access 250 according to the contents of the PDU Access Selection Policy ("PASP"), a separate policy provisioned in the UE 205.

If the UE 205 cannot find or establish a matching PDU session, the routing component 225 determines whether it is permitted to directly offload the packet to non-3GPP access 245. If the direct offload is permitted, then the routing component 225 sends the data packet 405 outside of any PDU session using the connected non-3GPP access 245 (i.e., directly offloads the packet without transferring the packet through the mobile communication network, e.g., the mobile core network 130 and its RAN). Otherwise, the routing component 225 determines that the packet cannot be transferred.

Figure 5:
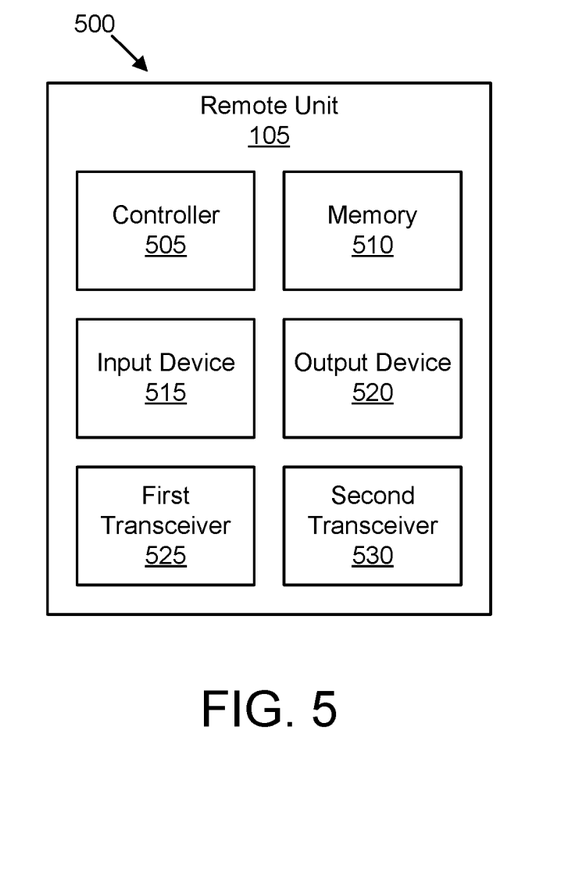
FIG. 5 is a schematic block diagram illustrating one embodiment of a computing device for data packet routing in a remote unit.

FIG. 5 depicts one embodiment of an apparatus 500 that may be used for data packet routing in a remote unit, according to embodiments of the disclosure. The apparatus 500 includes one embodiment of the remote unit 105. Furthermore, the remote unit 105 may include a processor 505, a memory 510, an input device 515, a display 520, a first transceiver 525 for communicating over a first access network (e.g., a 3GPP RAN), and a second transceiver 530 for communicating over a second access network (e.g., non-3GPP access). In some embodiments, the input device 515 and the display 520 are combined into a single device, such as a touchscreen. In certain embodiments, the remote unit 105 may not include any input device 515 and/or display 520.

The processor 505, in one embodiment, may include any known controller capable of executing computer-readable instructions and/or capable of performing logical operations. For example, the processor 505 may be a microcontroller, a microprocessor, a central processing unit ("CPU"), a graphics processing unit ("GPU"), an auxiliary processing unit, a field programmable gate array ("FPGA"), or similar programmable controller. In some embodiments, the processor 505 executes instructions stored in the memory 510 to perform the methods and routines described herein. The processor 505 is communicatively coupled to the memory 510, the input device 515, the display 520, the first transceiver 525, and the second transceiver 530.

In some embodiments, the processor 505 receives a data packet to be transmitted. For example, an application running on the processor 505 may generate a data packet. The data packet may be passed down to a routing layer (e.g., routing component 225 of the IP layer) implemented on the processor 505. For example, the routing layer may be provided by an operating system running on the processor 505.

The processor 505 further determines packet routing information for the data packet. Here, the packet routing information includes network slice information, a continuity type, and a data network name ("DNN") for the data packet. In one embodiment, the processor 505 determines the packet routing information by accessing a URP, such as the URP 300 described above, and comparing characteristics of the data packet to rules in the URP (in order of decreasing priority) until a matching rule is found. The processor 505 then retrieves the network slice information, a continuity type, and a data network name ("DNN") for the data packet from the matching URP rule.

In some embodiments, the matching URP rule includes a direct offload field indicating whether direct offload is preferred, permitted, or prohibited. If direct offload is preferred, the then processor 505 first attempts to directly offload the data packet to a connected non-3GPP access network before determining the packet routing information. In certain embodiments, the processor 505 attempts to connect to a non-3GPP access network directly offload the data packet if a connection with the non-3GPP access network specified in the matching rule is not already established.

Next, the processor 505 determines whether the packet routing information matches a network connection, such as an established PDU session. If the packet routing information matches a network connection (PDU session), then the processor 505 sends the data packet over the matching network connection.

Otherwise, if the packet routing information does not match a network connection, then the processor 505 requests a new network connection that supports the packet routing information. In certain embodiments, the processor 505 determines whether the requested new network connection cannot be established and determines (e.g., from the matching URP rule) whether direct offload is permitted. Where the new network connection cannot be established and where direct offload is permitted, the processor 505 offloads the data packet to a non-3GPP access network. With direct offload, the data packet does not pass through the mobile communication network.

The memory 510, in one embodiment, is a computer readable storage medium. In some embodiments, the memory 510 includes volatile computer storage media. For example, the memory 510 may include a RAM, including dynamic RAM ("DRAM"), synchronous dynamic RAM ("SDRAM"), and/or static RAM ("SRAM"). In some embodiments, the memory 510 includes non-volatile computer storage media. For example, the memory 510 may include a hard disk drive, a flash memory, or any other suitable non-volatile computer storage device. In some embodiments, the memory 510 includes both volatile and non-volatile computer storage media.

In some embodiments, the memory 510 stores data relating to data packet routing in a remote unit, for example storing the URP 300. In some embodiments, the memory 510 also stores program code and related data, such as an operating system or other controller algorithms operating on the remote unit 105 and one or more software applications.

The input device 515, in one embodiment, may include any known computer input device including a touch panel, a button, a keyboard, a stylus, a microphone, or the like. In some embodiments, the input device 515 may be integrated with the display 520, for example, as a touchscreen or similar touch-sensitive display. In some embodiments, the input device 515 includes two or more different devices, such as a keyboard and a touch panel. In certain embodiments, the input device 515 may include a camera for capturing images or otherwise inputting visual data.

The display 520, in one embodiment, may include any known electronically controllable display or display device. The display 520 may be designed to output visual, audible, and/or haptic signals. In some embodiments, the display 520 includes an electronic display capable of outputting visual data to a user. For example, the display 520 may include, but is not limited to, an LCD display, an LED display, an OLED display, a projector, or similar display device capable of outputting images, text, or the like to a user. As another, non-limiting, example, the display 520 may include a wearable display such as a smart watch, smart glasses, a heads-up display, or the like. Further, the display 520 may be a component of a smart phone, a personal digital assistant, a television, a table computer, a notebook (laptop) computer, a personal computer, a vehicle dashboard, or the like.

In certain embodiments, the display 520 includes one or more speakers for producing sound. For example, the display 520 may produce an audible alert or notification (e.g., a beep or chime). In some embodiments, the display 520 includes one or more haptic devices for producing vibrations, motion, or other haptic feedback. In some embodiments, all or portions of the display 520 may be integrated with the input device 515. For example, the input device 515 and display 520 may form a touchscreen or similar touch-sensitive display. In other embodiments, the display 520 may be located near the input device 515.

The first transceiver 525 communicates with a mobile communication network (e.g., a PLMN) using a first access network, such as the 3GPP radio access network. In some embodiments, the mobile communication network comprises the cellular base units 110 and a mobile core network 130 discussed above with reference to FIG. 1. The first transceiver 525 may include hardware circuitry and/or software code for communicating with the non-3GPP access network. For example, the first transceiver may include one or more transmitters used to provide UL communication signals to the cellular base unit 110 and one or more receivers used to receive DL communication signals from the cellular base unit 110.

The second transceiver 530, in one embodiment, is a radio transceiver used for communicating with another (e.g., second) access network, such as the non-3GPP access network. The second transceiver 530 may include hardware circuitry and/or software code for communicating with the non-3GPP access network. For example, the second transceiver 530 comprises a transmitter used to provide UL communication signals to a non-cellular access network 120 and a receiver used to receive DL communication signals from a non-cellular access network 120. While only two transceivers are depicted, the remote unit 105 may include additional transceivers for communicating over additional network (both wired and wireless).

Figure 6:
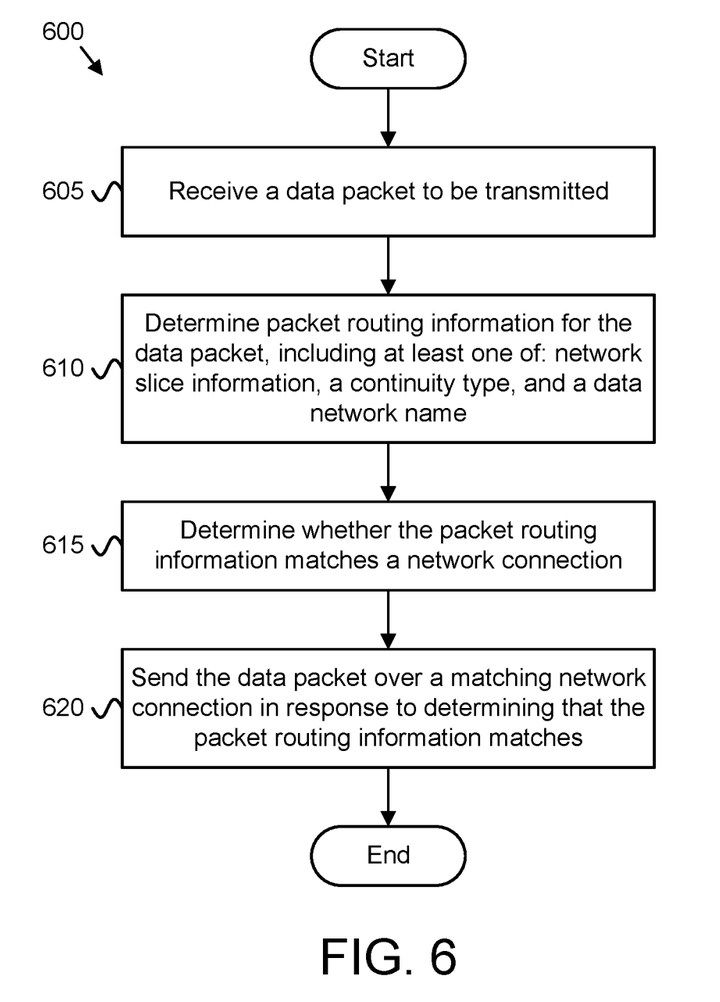
FIG. 6 is a schematic flow chart diagram illustrating one embodiment of a method for data packet routing in a remote unit.

FIG. 6 is a schematic flow chart diagram illustrating one embodiment of a method 600 for data packet routing in a remote unit, according to embodiments of the disclosure. In some embodiments, the method 600 is performed by an apparatus, such as the remote unit 105 or UE 205. In certain embodiments, the method 600 may be performed by a processor executing program code, for example, a microcontroller, a microprocessor, a CPU, a GPU, an auxiliary processing unit, a FPGA, or the like.

The method 600 includes receiving 605 a data packet to be transmitted. In one embodiment, a routing component 225 the UE 205 receives 605 the data packet from an upper layer. The method 600 includes determining 610 packet routing information for the data packet. Here, the packet routing information includes at least network slice information, a continuity type, and a data network name ("DNN"). In one embodiment, the UE 205 accesses a UE routing policy ("URP") and determines the packet routing information from a matching URP rule. A URP rule matches the data packet when characteristics of the data packet match a traffic filter component of the URP rule. The characteristics of the data packet may include an application identifier, a protocol type, a network port, and the like.

The method 600 includes determining 615 whether the packet routing information matches a network connection. In one embodiment, the routing component 225 determines whether the packet routing information matches an established PDU session. Here, a PDU session (or other network connection) matches the packet routing information when the PDU session supports the network slice information, continuity type, and data network name included in the matching URP rule. In response to determining 615 that the packet routing information matches a network connection, the method 600 includes sending 620 the data packet over the matching network connection (e.g., PDU session). The method 600 ends.

Figure 7:
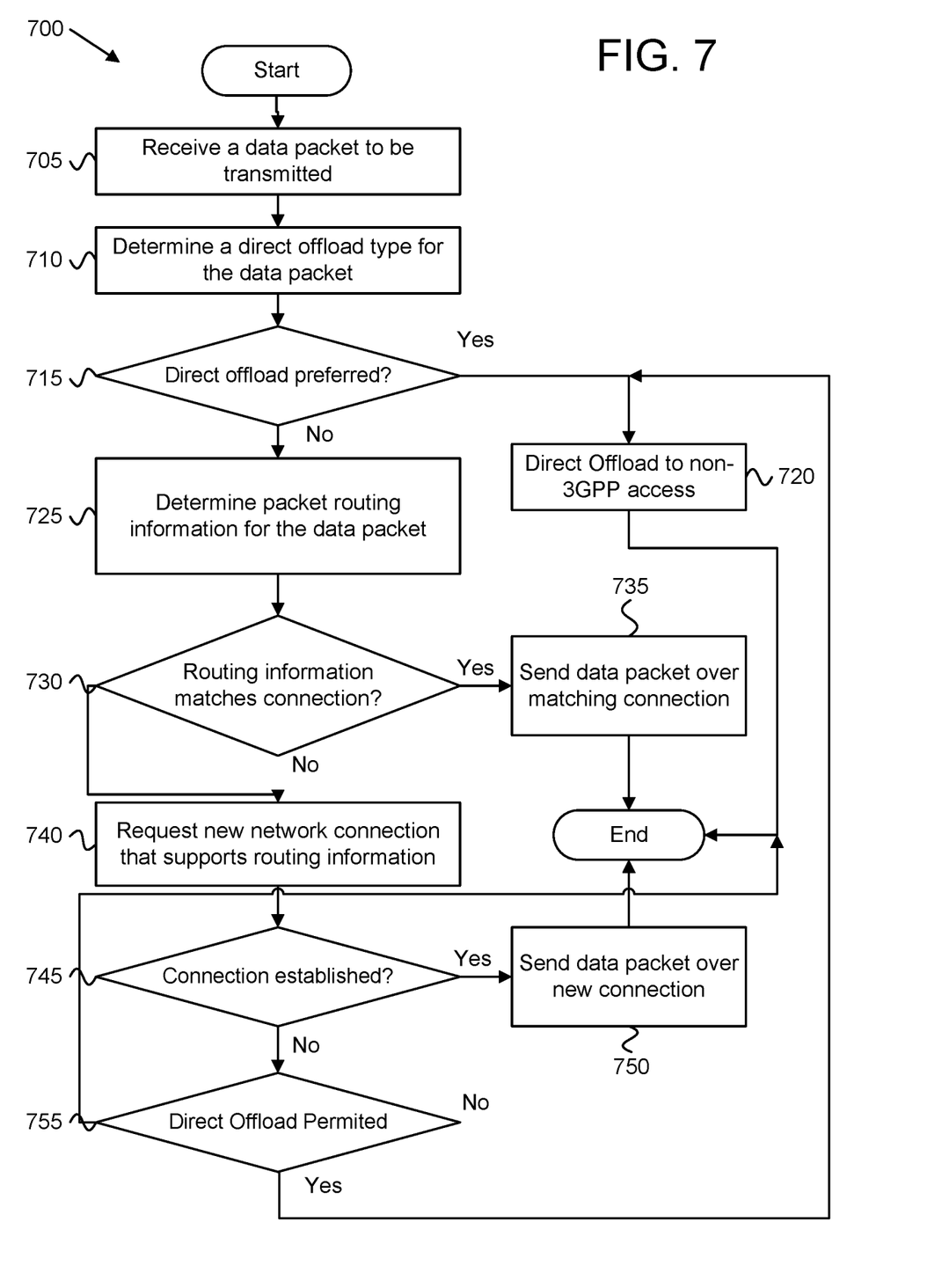
FIG. 7 is a schematic flow chart diagram illustrating another embodiment of a method for data packet routing in a remote unit.

FIG. 7 is a schematic flow chart diagram illustrating one embodiment of a method 700 for data packet routing in a remote unit, according to embodiments of the disclosure. In some embodiments, the method 700 is performed by an apparatus, such as the remote unit 105 or UE 205. In certain embodiments, the method 700 may be performed by a processor executing program code, for example, a microcontroller, a microprocessor, a CPU, a GPU, an auxiliary processing unit, a FPGA, or the like.

The method 700 includes receiving 705 a data packet to be transmitted. In one embodiment, a routing component 225 the UE 205 receives 705 the data packet from an upper layer. The method 700 includes determining 710 a direct offload type for the data packet. Here, the direct offload type is preferred, permitted, or prohibited. In one embodiment, the UE 205 accesses a UE routing policy ("URP") and determines 710 the direct offload type from a matching URP rule. A URP rule matches the data packet when characteristics of the data packet match a traffic filter component of the URP rule. The characteristics of the data packet may include an application identifier, a protocol type, a network port, and the like.

The method 700 includes determining 715 whether direct offload is preferred. In one embodiment, direct offload is preferred whenever the direct offload type is "preferred." Conversely, direct offload is not preferred whenever the direct offload type is "permitted" or "prohibited." In response to direct offload being preferred, the method 700 includes sending the data packet by direct offloading 720 the packet to a connected non-3GPP access. In certain embodiments, the UE 205 attempts to connect to a non-3GPP access network directly offload the data packet if a connection with the non-3GPP access network specified in the matching rule is not already established.

Otherwise, in response to direct offload not being preferred, the method 700 includes determining 725 packet routing information for the data packet. Here, the packet routing information includes at least network slice information, a continuity type, and a data network name ("DNN"). In one embodiment, the UE 205 accesses the URP and determines 725 the packet routing information from a matching URP rule.

The method 700 includes determining 730 whether the packet routing information matches a network connection. In one embodiment, the routing component 225 determines 730 whether the packet routing information matches an established PDU session. Here, a PDU session (or other network connection) matches the packet routing information when the PDU session supports the network slice information, continuity type, and data network name included in the matching URP rule. In response to determining 730 that the packet routing information matches a network connection, the method 700 includes sending 735 the data packet over the matching network connection (e.g., PDU session).

Otherwise, in response to determining 730 that the packet routing information does not match a network connection, the method 700 includes requesting 740 a new network connection (e.g., PDU session) that supports the packet routing information. The method 700 also includes determining 745 whether the new network connection is established. In response to determining 745 that the new network connection is established, the method 700 includes sending 750 the data packet over the new network connection.

Otherwise, in response to determining 730 that the packet routing information does not match a network connection, the method 700 includes determining 755 whether direct offload is permitted. In one embodiment, direct offload is permitted whenever the direct offload type is "permitted." Conversely, direct offload is not preferred whenever the direct offload type is "prohibited." In response to direct offload being preferred, the method 700 includes sending the data packet by direct offloading 720 the packet to a connected non-3GPP access. In certain embodiments, the UE 205 attempts to connect to a non-3GPP access network directly offload the data packet if a connection with the non-3GPP access network specified in the matching rule is not already established. Otherwise, in response to determining 755 that direct offloading is not permitted, the method 700 ends without sending the data packet.

Embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. An apparatus comprising:
   a transceiver that communicates with a mobile communication network using at least one network connection of the first connection type, each network connection of the first connection type being associated with network slice information, a continuity type, and a data network name ("DNN"); and
   a processor that:
   receives a user equipment routing policy ("URP") from the mobile communication network, the URP comprising a plurality of prioritized URP rules, each prioritized URP rule comprising a traffic filter component and at least of one of: a slice information component, a continuity type component, and a data network component;
   receives a data packet to be transmitted;
   determines packet routing information for the data packet, the packet routing information comprising at least one of: network slice information, a continuity type, and a DNN for the data packet, wherein determining packet routing information for the data packet comprises the processor:
   comparing characteristics of the data packet to traffic filter components of the URP;
   identifying a matching rule, the matching rule being a highest priority URP rule whose traffic filter component matches the characteristics of the data packet; and
   retrieving the packet routing information from the at least one of a slice information component, a continuity type component, and a data network component of the matching rule;
   determines whether the packet routing information matches a network connection; and
   sends the data packet over a matching network connection, in response to determining that the packet routing information matches a network connection.

2. The apparatus of claim 1, wherein the processor further requests a new network connection that supports the packet routing information, in response to determining that the packet routing information does not match a network connection.

3. The apparatus of claim 2, wherein the packet routing information further comprises an access type parameter, wherein requesting a new network connection that supports the packet routing information comprises identifying, from the access type parameter, an access network over which to establish the new network connection.

4. The apparatus of claim 2, wherein the processor further:
   determines whether the requested new network connection cannot be established;
   determines, from the packet routing information, whether direct offload is permitted; and
   sends the data packet using a second network connection type in response to determining that direct offload is permitted.

5. The apparatus of claim 1, wherein the processor further determines from the packet routing information whether direct offload to a connected access network is preferred for the data packet, wherein the processor determines whether the packet routing information matches a network connection in response to determining that direct offload to the connected access network is not preferred.

6. The apparatus of claim 1, wherein the slice information component comprises one of: a network slice selection parameter and a prioritized list of network slice selection parameters, wherein determining whether the packet routing information matches a network connection comprises the processor determining whether the network connection supports a network slice selection parameter in the matching rule.

7. The apparatus of claim 6, wherein the slice information component further comprises a service tenant, wherein determining whether the network connection supports a network slice selection parameter in the matching rule further comprises the processor determining whether the network connection is associated with the tenant in the matching rule.

8. The apparatus of claim 1, wherein the continuity type component comprises one of: a session and service continuity ("SSC") mode and a prioritized list of SSC modes, wherein determining whether the packet routing information matches a network connection comprises the processor determining whether the network connection supports a SSC mode in the matching rule.

9. The apparatus of claim 1, wherein the data network component comprises one of: a DNN and a prioritized list of DNNs, wherein determining whether the packet routing information matches a network connection comprises the processor determining whether the network connection is associated with a DNN in the matching rule.

10. The apparatus of claim 1, wherein each prioritized URP rule further comprises a direct offload component that indicates an offload type for a matching data packet, the offload type selected from the group consisting of: offload permitted, offload prohibited, and offload preferred.

11. The apparatus of claim 10, wherein the direct offload component further indicates one of: an access network type, an access network identifier, and a prioritized list of network identifiers for which direct offload is one of: permitted, prohibited, and preferred.

12. A method comprising:
   receiving, at a remote unit, a user equipment routing policy ("URP") from the mobile communication network, the URP comprising a plurality of prioritized URP rules, each prioritized URP rule comprising a traffic filter component and at least of one of: a slice information component, a continuity type component, and a data network component;

receiving, at the remote unit, a data packet to be transmitted;

determining, by the remote unit, packet routing information for the data packet, the packet routing information comprising at least one of: network slice information, a continuity type, and a data network name ("DNN") associated with the data packet, wherein determining packet routing information for the data packet comprises:

comparing characteristics of the data packet to traffic filter components of the URP;

identifying a matching rule, the matching rule being a highest priority URP rule whose traffic filter component matches the characteristics of the data packet; and retrieving the packet routing information from the at least one of a slice information component, a continuity type component, and a data network component of the matching rule;

determining, by the remote unit, whether the packet routing information matches a network connection of a first connection type, the remote unit having at least one network connection to a mobile communication network of the first connection type, each network connection of the first connection type being associated with network slice information, a continuity type, and a DNN; and sending, by the remote unit, the data packet over a matching network connection, in response to determining that the packet routing information matches a network connection.

13. The method of claim 12, further comprising the remote unit requesting a new network connection that supports the packet routing information, in response to determining that the packet routing information does not match a network connection.

14. The method of claim 13, wherein the packet routing information further comprises an access type parameter, wherein requesting a new network connection that supports the packet routing information comprises identifying, from the access type parameter, an access network over which to establish the new network connection.

15. The method of claim 13, further comprising the remote unit:

determining whether the requested new network connection cannot be established;

determining, from the packet routing information, whether direct offload is permitted; and sending the data packet using a second network connection type in response to determining that direct offload is permitted.

16. The method of claim 12, further comprising the remote unit:

determining, from the packet routing information, whether direct offload to a connected access network is preferred for the data packet, wherein determining whether the packet routing information matches a network connection occurs in response to determining that direct offload to the connected access network is not preferred.

17. The method of claim 12, wherein each prioritized URP rule further comprises a direct offload component that indicates an offload type for a matching data packet, the offload type selected from the group consisting of: offload permitted, offload prohibited, and offload preferred.

18. An apparatus comprising:

a transceiver that communicates with a mobile communication network using at least one network connection of the first connection type, each network connection of the first connection type being associated with network slice information, a continuity type, and a data network name ("DNN"); and a processor that:

receives a user equipment routing policy ("URP") from the mobile communication network, the URP comprising a plurality of prioritized URP rules, each prioritized URP rule comprising a traffic filter component and at least of one of: a slice information component, a continuity type component, and a data network component;

receives a data packet to be transmitted;

determines packet routing information for the data packet, the packet routing information comprising at least one of: network slice information, a continuity type, and a DNN for the data packet, wherein determining packet routing information for the data packet comprises the processor:

comparing characteristics of the data packet to traffic filter components of the URP;

identifying a matching rule, the matching rule being a highest priority URP rule whose traffic filter component matches the characteristics of the data packet; and retrieving the packet routing information from the at least one of a slice information component, a continuity type component, and a data network component of the matching rule;

determines whether the packet routing information matches a network connection of the first connection type; and requests a new network connection that supports the packet routing information, in response to determining that the packet routing information does not match a network connection of the first connection type.

19. The apparatus of claim 18, wherein the packet routing information further comprises an access type parameter, wherein requesting a new network connection that supports the packet routing information comprises identifying, from the access type parameter, an access network over which to establish the new network connection.

* * * * *